(12) United States Patent
Luo et al.

(10) Patent No.: US 11,454,557 B2
(45) Date of Patent: Sep. 27, 2022

(54) FLEXIBLE STRESS SENSING DEVICE OF FULL-TEXTILE MATERIALS

(71) Applicant: WUYI UNIVERSITY, Jiangmen (CN)

(72) Inventors: Jianyi Luo, Jiangmen (CN); Jingcheng Huang, Jiangmen (CN); Xiaoyan Hu, Jiangmen (CN); Baowen Liang, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 709 days.

(21) Appl. No.: 16/461,143

(22) PCT Filed: May 9, 2018

(86) PCT No.: PCT/CN2018/086214
§ 371 (c)(1),
(2) Date: May 15, 2019

(87) PCT Pub. No.: WO2019/205193
PCT Pub. Date: Oct. 31, 2019

(65) Prior Publication Data
US 2020/0271532 A1   Aug. 27, 2020

(30) Foreign Application Priority Data

Apr. 28, 2018   (CN) .......................... 201810403135.0

(51) Int. Cl.
*G01L 1/00* (2006.01)
*G01L 1/22* (2006.01)
(Continued)

(52) U.S. Cl.
CPC .......... *G01L 1/2287* (2013.01); *D03D 1/0088* (2013.01); *D03D 13/004* (2013.01);
(Continued)

(58) Field of Classification Search
CPC .. G01L 1/2287; D03D 1/0088; D03D 13/004; D10B 2201/01; D10B 2211/04; D10B 2331/04; D10B 2401/18
See application file for complete search history.

(56) References Cited

U.S. PATENT DOCUMENTS 5,143,089 A * 9/1992 Alt ....................... A61N 1/0587
607/121
2010/0144490 A1* 6/2010 Purdy ................ A63B 21/4013
2/69
(Continued)

FOREIGN PATENT DOCUMENTS

CN          101393058 A       3/2009
CN          107271084 A       10/2017
(Continued)

OTHER PUBLICATIONS

Wei, Yong et al: Multiscale Wrinkled Microstructures for Piezoresistive Fibers, Advanced Functional Materials 2016.
(Continued)

*Primary Examiner* — Max H Noori
(74) *Attorney, Agent, or Firm* — Schmeiser, Olsen & Watts, LLP

(57) ABSTRACT

A flexible stress sensing device is provided, which includes a flexible cloth substrate, a flexible stress sensor and textile knots configured to fix the flexible stress sensor on the flexible cloth substrate. The flexible stress sensor includes two conductive fiber bundles, wherein each of the conductive fiber bundles is provided with a loose structure, and the loose structures of two conductive fiber bundles contact with each other and form a stress sensing unit. The flexible stress sensing device can be washable, is not easy to fall off, and can resist against motion interference, and has other advantages of high resolution, high sensitivity and a compatibility with the prior textile techniques.

7 Claims, 3 Drawing Sheets

(51) Int. Cl.
*D03D 1/00* (2006.01)
*D03D 13/00* (2006.01)

(52) U.S. Cl.
CPC ...... *D10B 2201/01* (2013.01); *D10B 2211/04* (2013.01); *D10B 2331/04* (2013.01); *D10B 2401/18* (2013.01)

(56) References Cited

U.S. PATENT DOCUMENTS

| | | | | |
|---|---|---|---|---|
| 2011/0259488 | A1* | 10/2011 | Zhao | B60C 17/0009 152/152.1 |
| 2015/0241530 | A1* | 8/2015 | Schmid | G01R 33/422 324/322 |
| 2016/0290880 | A1* | 10/2016 | Lewis | G01L 1/20 |
| 2017/0224280 | A1 | 8/2017 | Bozkurt et al. | |

FOREIGN PATENT DOCUMENTS

| WO | 2016073655 A2 | 5/2016 |
|---|---|---|
| WO | WO2016073655 A2 | 5/2016 |

OTHER PUBLICATIONS

Gong, Shu et al: A Wearable and Highly Sensitive Pressure Sensor With Ultrathin Gold Nanowires, Nature Communications.
Liu, Mengmeng et al: Large-Area All-Textiles Pressure Sensors for Monitoring Human Motion and Physiological Signals, Advanced Materials 2017.

* cited by examiner

FLEXIBLE STRESS SENSING DEVICE OF FULL-TEXTILE MATERIALS

CROSS-REFERENCE TO RELATED APPLICATIONS

This application claims priority to PCT Application No. PCT/CN2018/086214 filed on May 9, 2018, which claims priority to Chinese Patent Application No. CN201810403135.0 filed on Apr. 28, 2018, the entire contents both of which are hereby incorporated by reference.

FIELD OF TECHNOLOGY

The following relates to the technical field of sensor devices, in particular to a flexible stress sensing device of full-textile materials.

BACKGROUND

Along with the development of science and technology and needs of a pursuit for a better life, wearable electronics represented by such products as iwatch and MI bands have begun to come out constantly. These products have not only changed our lifestyle, but also effectively monitored our physical and mental health. While among wearable devices, related techniques of a flexible stress sensor, which is the most crucial device, are often in the hands of industrially advanced countries including the USA, Japan and Germany.

At present, when a photoelectric sensor is used, measurement errors are easily caused due to such factors as optical interference caused by the environment and skin color, sweat and fat thickness of a wearer. On the other hand, wearable products available on the market now are mainly worn by users, such as electronic products like bracelets, watches and glasses, and these electronic products cannot really be wearable and washable like clothes. A key to solving this problem is to develop a flexible electronic device which is compatible with cloth.

In order to solve the problems that traditional stress sensors can only be worn on our wrists but cannot be worn like clothes and the signals are relatively weak, researchers have gradually paid close attention to performing material modification on textile-like materials, aiming at realizing real worn devices with a high sensitivity. Yong Wei et al formed a type of specialty fiber with a stress sensing performance after coating a certain amount of silver nanowire on the surface of polyurethane fiber. When this type of fiber is stretched, resistance will be correspondingly changed. Similarly, such a sensor also has the problem of insufficient sensitivity. When fingers are bent, the corresponding rate of change of resistance is only 0.02%. In addition, in practical applications, the sensor also has the problems that the silver nanowire is easily oxidized and detached. Shu Gong et al then carried out researches from two aspects including substrate materials and electrode structures. Firstly, paper is adopted as a substrate material, and then gold nanowire is modified on the substrate to coat filaments in the paper, thereby solving the problem that the substrate is not conductive. On the other hand, the modified paper-base material is covered on an interdigital electrode, and a sandwich is formed through polydimethylsiloxane thin film protection, so as to improve electrical stability and structural stability. The flexible sensor prepared through such a method has favorable softness and electrical conductivity, and meanwhile, with the existence of the interdigital electrode structure, the current increases significantly under the effect of stress. While Liu Mengmeng et al made further optimizations and improvements on the basis of the work of Shu Gong et al, replaced the substrate material with common textile cloth, and performed coating treatment through a carbon nano tube, thereby effectively lowering cost and simplifying preparation process. In the aspect of electrode, a spraying method is adopted to perform coating treatment of metallic nickel on textile cloth, so as to form a cloth interdigital electrode coated with nickel, and finally, a sandwich structure is installed together with VHB adhesive tapes manufactured by 3M Company, so as to form a stress sensor based on a cloth substrate. Compared with paper-base materials, a cloth substrate has better bending and stretching performances, can be expected to be compatible with the existing cloth process, while in terms of performance, a stress of 60 Pa can be detected to the minimum, and the current can be increased to 10 times that of the initial current to the maximum.

Although the above resistance-type stress sensor solves the problem of a photoelectric sensor which is easily interfered by objective factors, and can also be subjected to bending deformation and can be worn, however, the resistance-type stress sensor is still difficult to be compatible with traditional cloth, and especially cannot be cleaned and recycled for multiple times like clothes. If only the surface of traditional cloth is subjected to modification of a functional film layer, for example, through such manners as spraying a conductive material layer, although the flexible stress sensing performance can be realized, and the resistance-type stress sensor can also be compatible with cloth, however, there is often a problem that the functional film layer easily falls off in the use process or in the process of multiple cleaning.

Therefore, it's an urgent need for the development of intelligent wearable electronic products to develop a flexible stress sensing device of full-textile materials which can be washable and can resist against motion interference and which can ensure a favorable wearing experience.

SUMMARY

An aspect relates to a flexible stress sensing device of full-textile materials. Such a flexible stress sensing device of full-textile materials can be washable, is not easy to fall off, and can resist against motion interference, and has other advantages of high resolution, high sensitivity and a compatibility with the prior textile techniques.

In order to achieve the above aspect, technical solutions adopted in embodiments of the present invention are as follows:

A flexible stress sensing device of full-textile materials including:

a flexible cloth substrate;

a flexible stress sensor including two conductive fiber bundles, wherein each of the conductive fiber bundles has a loose structure, and the loose structures of the two conductive fiber bundles contact with each other and form a stress sensing unit; and four textile knots configured to fix the flexible stress sensor on the flexible cloth substrate.

Working principles of embodiments of the present invention are as follows: firstly, multiple conductive filaments are adopted to constitute a conductive fiber bundle with a loose structure, two conductive fiber bundles are set to contact with each other in a crossed manner to form a stress sensing unit, and the stress sensing unit is fixed on the non-conductive flexible cloth substrate under the effect of four textile knots to form a flexible stress sensor; secondly, the conductive fiber bundles are utilized to serve as leads to realize electrical connection with an external circuit, such that current flows through the stress sensing unit with loose structures; and finally, under the effect of an external stress, the resistance of the stress sensing unit with loose structures will be decreased, the rate of change of resistance is in a corresponding relationship with the size of the external stress, and after the external stress is removed, the stress sensing unit can recover to its initial resistance.

Compared with the known art, the flexible stress sensing device of full-textile materials in embodiments of the present invention has the following advantages:

(1) Conductive fiber bundles with a loose structure are utilized to construct a stress sensor based on conductive fiber contact knot. In the sensor, the loose structure will be compressed under the effect of an external stress, thereby leading to a decrease of resistance of the contact knot, and the magnitude of stress is induced through measuring the rate of change of resistance of the contact knot, meanwhile, electrical conductivity of the conductive fiber bundle itself is utilized, and the conductive fiber bundle can serve as a wire with no need of an additional lead, thereby providing a possibility for realizing the stress sensing device of full-textile materials.

(2) By adopting a method which is compatible with textile manufacturing, a flexible stress sensing device of full-textile materials is woven into cloth or textiles with no need of adding other materials, therefore, under the premise of not changing functions and properties of cloth or textiles themselves, a flexible stress sensing device which can be worn and washed and which can effectively monitor heart rate and pulse is realized.

In order to achieve a better technical effect, further technical improvements also include that each loose structure includes multiple conductive filaments, and a plurality of gaps exist between the multiple conductive filaments; and in the stress sensing unit, an amount of conducting current paths formed between conductive filaments which contact with each other and gaps between conductive filaments are correspondingly changed along with a change of an external force.

In order to achieve a better technical effect, further technical improvements also include that the loose structures of the two conductive fiber bundles are mutually stacked in a crossed manner or are interspersed with each other or are in butt joint with each other.

In order to achieve a better technical effect, further technical improvements also include that the stress sensing unit is fixed on the flexible cloth substrate via the four textile knots, and a distance between each textile knot and a center of the stress sensing unit is greater than 1 mm.

In order to achieve a better technical effect, further technical improvements also include that the conductive filaments are carbon, metal or conductive polymer materials.

In order to achieve a better technical effect, further technical improvements also include that the amount of the multiple conductive filaments of each loose structure is more than 10.

In order to achieve a better technical effect, further technical improvements also include that the flexible stress sensor is connected with two wires which extend outwards.

In order to achieve a better technical effect, further technical improvements also include that the flexible cloth substrate is a non-conductive material, which may be hemp, mulberry silk, polyester, plain cloth, fine cloth, silk or flannel.

BRIEF DESCRIPTION

Some of the embodiments will be described in detail, with references to the following Figures, wherein like designations denote like members, wherein.

DETAILED DESCRIPTION

Figure 1:
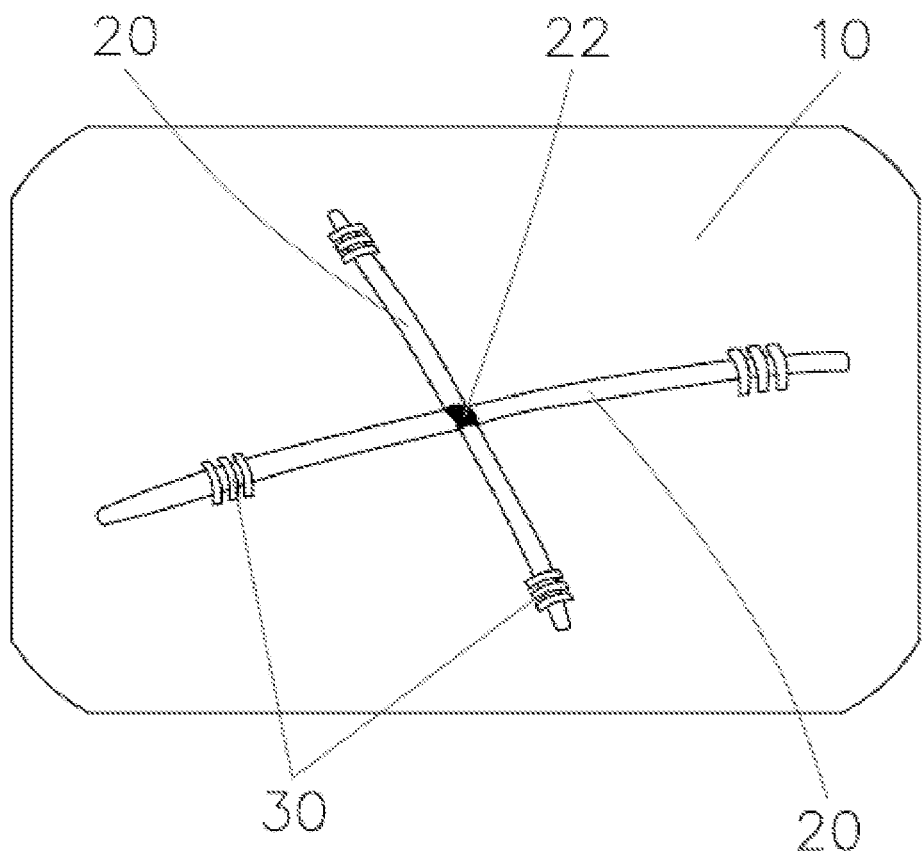
FIG. 1 is a structural schematic diagram of a flexible stress sensing device of full-textile materials of Embodiment 1.
Figure 2:
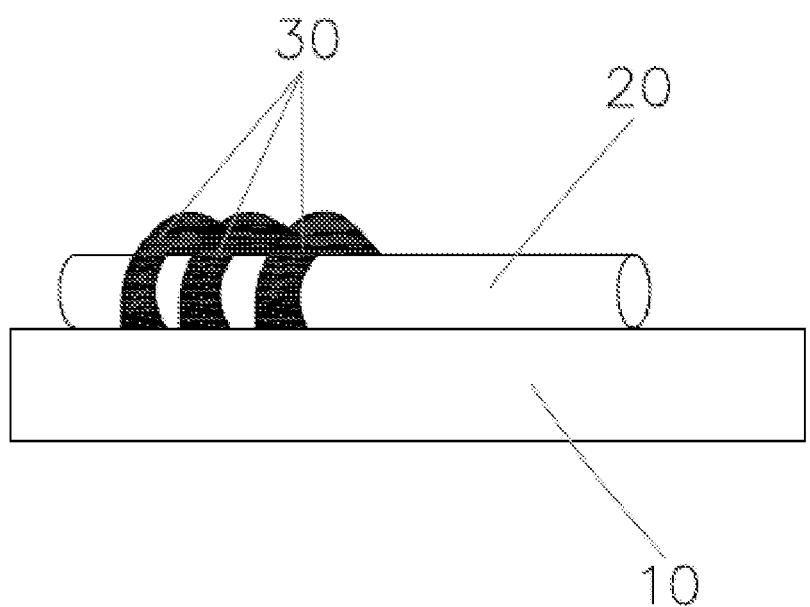
FIG. 2 is another schematic diagram of a flexible stress sensing device of full-textile materials of Embodiment 1.
Figure 3:
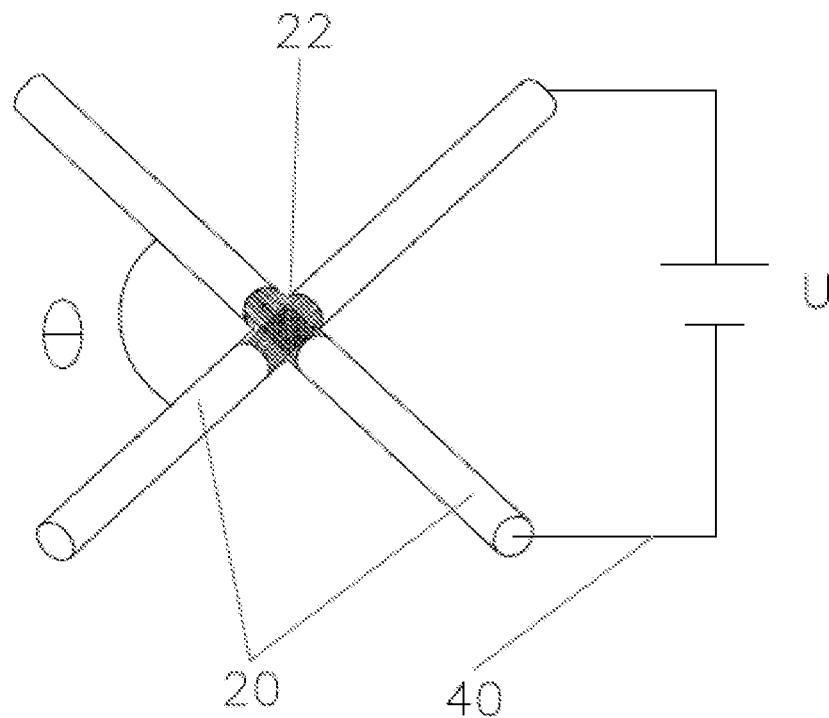
FIG. 3 is a structural schematic diagram of a flexible stress sensor of Embodiment 1.
Figure 4:
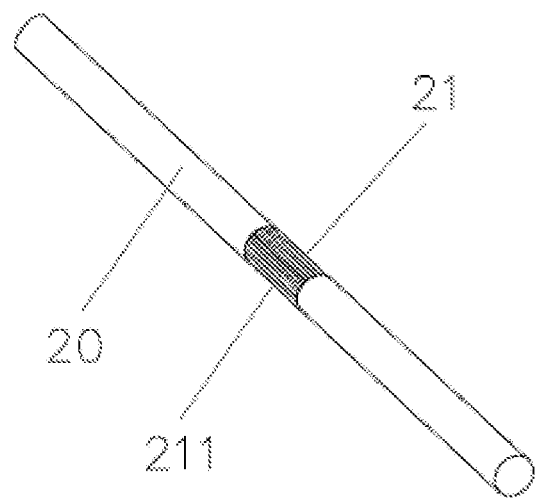
FIG. 4 is a structural schematic diagram of conductive fiber bundles of Embodiment 1.

For a further description of each embodiment, accompanying drawings are provided in embodiments of the present invention. These accompanying drawings are a part of the contents disclosed in embodiments of the present invention, and are mainly used for describing embodiments and explaining, in cooperation with related description of the description, operating principles of the embodiments. In cooperation with a reference to these contents, those skilled in the art should be capable of understanding other possible implementations and advantages of embodiments of the present invention.

Embodiment 1

Please refer to FIG. 1 to FIG. 4 simultaneously.

A flexible stress sensing device of full-textile materials of embodiments of the present invention comprises a flexible cloth substrate 10, a flexible stress sensor and textile knots 30 configured to fix the flexible stress sensor on the flexible cloth substrate 10, wherein the flexible stress sensor is electrically connected with an external circuit.

The flexible cloth substrate 10 is a non-conductive material, which may be hemp, mulberry silk, polyester, plain cloth, fine cloth, silk or flannel.

Specifically, the flexible stress sensor includes two conductive fiber bundles 20, wherein each of the conductive fiber bundles 20 is provided with a loose structure 21, and the loose structures 21 of the two conductive fiber bundles 20 are stacked with each other in a crossed manner and form a stress sensing unit 22. It should be noted that, in the stress sensing unit 22, the amount of conducting current paths formed between conductive filaments 211 which contact with each other and gaps between conductive filaments 211 are correspondingly changed along with the change of an external force.

Wherein each loose structure 21 includes multiple conductive filaments 211, and multiple gaps exist between the multiple conductive filaments 211. The loose structures 21 of the two conductive fiber bundles 20 are stacked in a crossed manner to form a stress sensing unit 22.

An included angle θ formed through crossed stacking of the two conductive fiber bundles 20 is in a range of 2° to 178°. In addition, the amount of the multiple conductive filaments 211 of each loose structure 21 is greater than 10; moreover, the conductive filaments 211 are carbon, metal or conductive polymer materials.

Wherein, the two conductive fiber bundles 20 are respectively connected with two wires 40 which extend outwards.

The number of the textile knots 30 is four. The flexible cloth substrate 10 is provided with a jacquard structure, the stress sensing unit 22 is fixed on the jacquard structure of the flexible cloth substrate 10 via the four textile knots 30, and the distance between each textile knot 30 and the center of the stress sensing unit 22 is greater than 1 mm.

Figure 5:
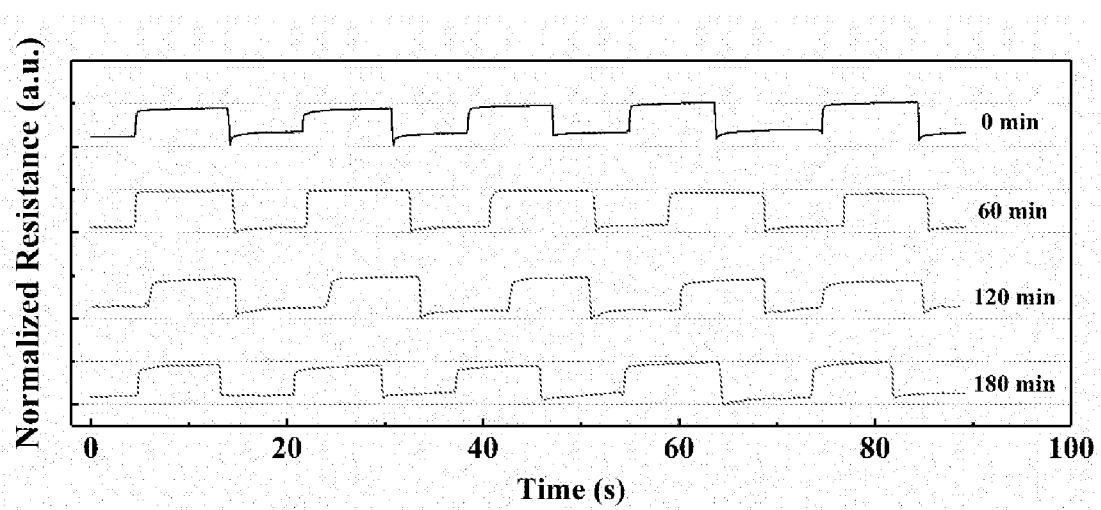
FIG. 5 is a stress response curve graph of a flexible stress sensing device of full-textile materials of embodiment 1 after multiple ultrasonic cleaning and drying.

In addition, as shown in FIG. 5, after multiple ultrasonic cleaning and drying for as long as 60 min and under a pressure of 20 mN, the flexible stress sensing device of full-textile materials of embodiments of the present invention can still maintain its stress response performance before cleaning, thereby fully proving that the solution proposed in embodiments of the present invention is feasible and completely realizing a washable effect of devices.

Working principles of the flexible stress sensor of full-textile materials of embodiments of the present invention are described below:

Under the effect of an external force F1, the amount of conducting current paths formed between conductive filaments 211 which contact with each other on the surfaces of the two loose structures 21 is increased along with an increase of the external force, such that the resistance of the flexible stress sensor decreases sharply;

When the external force F1 continuously increases to F2, the amount of conducting current paths formed between conductive filaments 211 which contact with each other on the surfaces of the two loose structures 21 reaches a maximum value; along with a further increase of F2, the size of the gap between conductive filaments 211 inside each loose structure 21 is gradually decreased, and the growth rate of the amount of conducting current paths formed between conductive filaments 211 which contact with each other is gradually lowered, such that the resistance of the flexible stress sensor is gradually decreased;

When the external force F2 gradually increases to F3, the size of gaps formed between conductive filaments 211 of the stress sensing unit 22 and the amount of the formed conducting current paths have already been saturation values; even if the external force is still increased constantly, the resistance of the flexible stress sensor is no longer changed and has reached its saturation value;

When the external force is removed, the whole structure of the flexible stress sensor recovers to its initial state, and the resistance recovers to its initial resistance;

Wherein, F1, F2 and F3 are all external force values of different numeric values.

Embodiment 2

Figure 6:
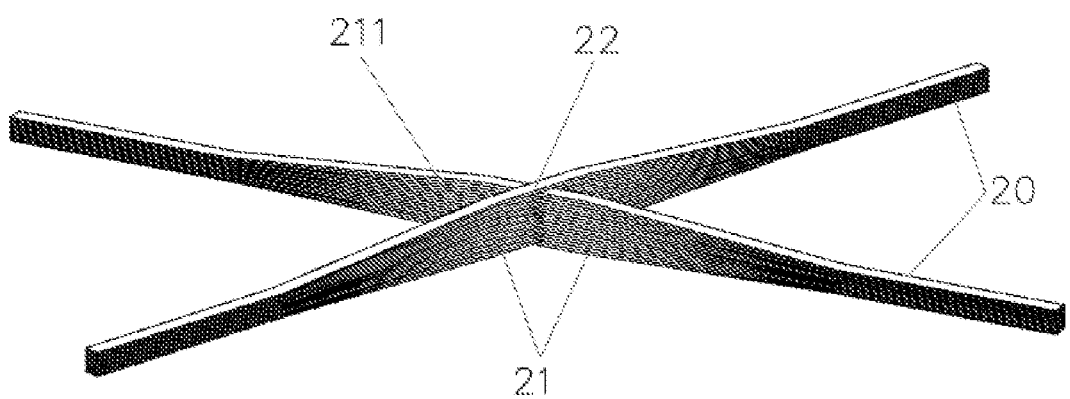
FIG. 6 is a structural schematic diagram of a flexible stress sensing device of full-textile materials of Embodiment 2.

As shown in FIG. 6, the present embodiment differs from embodiment 1 in that the loose structures 21 of the two conductive fiber bundles 20 in the present embodiment can also be interspersed with each other to form a stress sensing unit 22. It should be noted that, in the stress sensing unit 22, the amount of conducting current paths formed between conductive filaments 211 which contact with each other and gaps between conductive filaments 211 are correspondingly changed along with the change of an external force.

Wherein, conductive filaments 211 of the stress sensing unit 22 are interspersed uniformly or non-uniformly, and multiple electric channels which are conducting or not conducting are formed.

Embodiment 3

Figure 7:
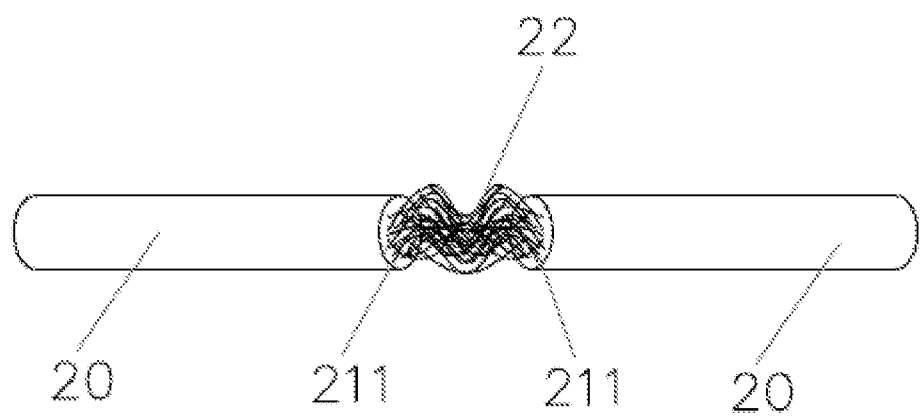
FIG. 7 is a structural schematic diagram of a flexible stress sensing device of full-textile materials of Embodiment 3.

As shown in FIG. 7, the present embodiment differs from embodiment 1 in that the loose structures 21 of two conductive fiber bundles 20 in the present embodiment can also be in butt joint with each other to form a stress sensing unit 22. It should be noted that, in the stress sensing unit 22, the amount of conducting current paths formed between conductive filaments 211 which contact with each other and gaps between conductive filaments 211 are correspondingly changed along with the change of an external force.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed:
1. A flexible stress sensing device comprising:
a flexible cloth substrate;
a flexible stress sensor including two conductive fiber bundles, wherein each of the conductive fiber bundles has a loose structure, and the loose structures of the two conductive fiber bundles contact with each other and form a stress sensing unit; and
four textile knots configured to fix the flexible stress sensor on the flexible cloth substrate;
wherein each loose structure includes multiple conductive filaments, and a plurality of gaps exist between the multiple conductive filaments; and in the stress sensing unit, an amount of conducting current paths formed between conductive filaments which contact with each other and gaps between conductive filaments are correspondingly changed along with a change of an external force.

2. The flexible stress sensing device of claim 1, wherein the flexible cloth substrate is a non-conductive material, which may be hemp, mulberry silk, polyester, plain cloth, fine cloth, silk or flannel.

3. The flexible stress sensing device of claim 1, wherein the loose structures of the two conductive fiber bundles are mutually stacked in a crossed manner or are interspersed with each other or are in butt joint with each other.

4. The flexible stress sensing device of claim 1, wherein the stress sensing unit is fixed on the flexible cloth substrate via the four textile knots, and a distance between each textile knot and a center of the stress sensing unit is greater than 1 mm.

5. The flexible stress sensing device of claim 1, wherein the conductive filaments are carbon, metal or conductive polymer materials.

6. The flexible stress sensing device of claim 5, wherein the amount of the multiple conductive filaments of each loose structure is more than 10.

7. The flexible stress sensing device of claim 1, wherein the flexible stress sensor is connected with two wires which extend outwards.

* * * * *